United States Patent
Wang et al.

(10) Patent No.: US 10,890,801 B2
(45) Date of Patent: Jan. 12, 2021

(54) BACKLIGHT MODULE, DISPLAY DEVICE AND FABRICATING METHOD FOR BACKLIGHT MODULE

(71) Applicants: Beijing BOE Display Technology Co., Ltd., Beijing (CN); BOE Technology Group Co., Ltd., Beijing (CN)

(72) Inventors: Meili Wang, Beijing (CN); Xiaoling Xu, Beijing (CN); Yuanxin Du, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/318,886

(22) PCT Filed: Apr. 23, 2018

(86) PCT No.: PCT/CN2018/084089
§ 371 (c)(1),
(2) Date: Jan. 18, 2019

(87) PCT Pub. No.: WO2018/228056
PCT Pub. Date: Dec. 20, 2018

(65) Prior Publication Data
US 2019/0285946 A1 Sep. 19, 2019

(30) Foreign Application Priority Data
Jun. 15, 2017 (CN) .......................... 2017 1 0453695

(51) Int. Cl.
*G02F 1/1335* (2006.01)
*G02F 1/133* (2006.01)
(Continued)

(52) U.S. Cl.
CPC .... *G02F 1/133603* (2013.01); *G02F 1/13306* (2013.01); *G02F 1/133528* (2013.01);
(Continued)

(58) Field of Classification Search
CPC ......... G02F 1/133603; G02F 1/133606; G02F 1/13306; G02F 1/133528;
(Continued)

(56) References Cited

U.S. PATENT DOCUMENTS

2008/0309853 A1* 12/2008 Ge .................... G02F 1/133555
349/96
2010/0118222 A1 5/2010 Lee
(Continued)

FOREIGN PATENT DOCUMENTS

CN 101742750 A 6/2010
CN 106019454 A 10/2016
(Continued)

OTHER PUBLICATIONS

International Search Report and Written Opinion of the International Searching Authority (with English language translation of Written Opinion), International Application No. PCT/CN2018/084089, dated Aug. 6, 2018, 11 pp.
(Continued)

*Primary Examiner* — Andrew Sasinowski
(74) *Attorney, Agent, or Firm* — Myers Bigel, P.A.

(57) ABSTRACT

The present disclosure relates to the field of display technology, and provides a backlight module, a display device, and a fabricating method for the backlight module. Specifically, the backlight module includes a first substrate having a first surface and a second surface opposite to each other, a plurality of light emitting units arranged in an array on the first surface of the first substrate, a metal wire grid polarizer on the second surface of the first substrate, and a driving
(Continued)

circuit. The driving circuit is electrically connected to the plurality of light emitting units to drive the plurality of light emitting units to emit light toward the first substrate.

15 Claims, 3 Drawing Sheets

(51) Int. Cl.
*G09G 3/36* (2006.01)
*G02F 1/13357* (2006.01)

(52) U.S. Cl.
CPC ..... *G02F 1/133606* (2013.01); *G09G 3/3648* (2013.01); *G02F 2001/133548* (2013.01); *G02F 2001/133612* (2013.01); *G09G 2310/0264* (2013.01)

(58) Field of Classification Search
CPC ........ G02F 2001/133612; G02F 2001/133548; G09G 3/3648; G09G 2310/0264; G09G 3/3413
See application file for complete search history.

(56) References Cited

U.S. PATENT DOCUMENTS

| 2014/0327710 | A1* | 11/2014 | Xu | ................... | G09G 3/003 345/698 |
| 2015/0062500 | A1 | 3/2015 | Park et al. | | |
| 2016/0202791 | A1 | 7/2016 | Bae et al. | | |

FOREIGN PATENT DOCUMENTS

| CN | 107193158 A | 9/2017 |
| CN | 206892503 U | 1/2018 |
| KR | 10-2007-0050237 A | 5/2007 |
| KR | 10-2012-0040413 A | 4/2012 |

OTHER PUBLICATIONS

First Office Action with English language translation, CN Application No. 201710453695.2, dated May 27, 2019, 12 pp.

* cited by examiner

BACKLIGHT MODULE, DISPLAY DEVICE AND FABRICATING METHOD FOR BACKLIGHT MODULE

CROSS-REFERENCE TO RELATED APPLICATION(S)

The present application is a 35 U.S.C. 371 national stage application of PCT International Application No. PCT/CN2018/084089, filed on Apr. 23, 2018, which claims the benefit of Chinese Patent Application No. 201710453695.2, filed on Jun. 15, 2017, the contents of which are incorporated herein by reference in their entireties. The above-referenced PCT International Application was published in the Chinese language as International Publication No. WO 2018/228056 A1 published on Dec. 20, 2018.

TECHNICAL FIELD

The present disclosure relates to the field of display technology, in particular to a backlight module, a display device and a fabricating method for the backlight module.

BACKGROUND

A display device typically includes a backlight module and a display panel, wherein the backlight module is used to provide a light source for the display panel. Specifically, the display panel generally includes a lower polarizer, an array substrate, a liquid crystal layer, a color filter substrate and an upper polarizer that are sequentially disposed. In such a case, light, emitted by the backlight module, passes through the lower polarizer, the array substrate, the liquid crystal layer, the color filter substrate and the upper polarizer sequentially, thereby obtaining display.

Currently, a backlight module generally includes a light source, a light guide plate, a reflector, a diffuser, a prism, etc. When a display device is used, the backlight module is required to be used in combination with the lower polarizer. Thus, the light emitted from the light source of the backlight module will firstly pass through the light guide plate, the diffuser and the prism, and then pass through the lower polarizer, thereby converting the un-polarized light into linearly polarized light.

The present inventors have found that for current display devices, the backlight module is relatively complicated in structure, and each component has a certain thickness. In particular, the thickness of the light guide plate is large, resulting in a large thickness of the entire backlight module. In addition, in the conventional display device, it is also required to obtain linearly polarized light by combining the backlight module and the lower polarizer. However, when the light emitted by the backlight module passes through the lower polarizer, the transmittance of the lower polarizer is low. Typically, only at most 42% of the light is transmitted through the lower polarizer, which results in low utilization of the light emitted from the backlight module.

SUMMARY

According to an aspect of the present disclosure, a backlight module is provided. Specifically, the backlight module includes: a first substrate having a first surface and a second surface opposite to each other; a plurality of light emitting units arranged in an array on the first surface of the first substrate; a metal wire grid polarizer disposed on the second surface of the first substrate; and a driving circuit, wherein the driving circuit is electrically connected to the plurality of light emitting units to drive the plurality of light emitting units to emit light toward the first substrate.

According to a specific implementation, in the backlight module provided by an embodiment of the present disclosure, the driving circuit is disposed between the first substrate and the plurality of light emitting units, and includes transparent regions and non-transparent regions arranged in an array, wherein the plurality of light emitting units is disposed in the transparent regions of the driving circuit.

According to a specific implementation, the backlight module provided by an embodiment of the present disclosure further includes a second substrate. Further, the second substrate is disposed on a side of the plurality of light emitting units away from the first substrate, and the driving circuit is disposed on a side of the second substrate facing the plurality of light emitting units.

According to a specific implementation, in the backlight module provided by an embodiment of the present disclosure, the driving circuit includes a plurality of sub-driving circuits, wherein each of the sub-driving circuits is disposed opposite to and integrated with a corresponding one of the light emitting units.

According to a specific implementation, in the backlight module provided by an embodiment of the present disclosure, each light emitting unit includes a first sub-light emitting unit configured to emit red light, a second sub-light emitting unit configured to emit green light, and a third sub-light emitting unit configured to emit blue light.

According to a specific implementation, in the backlight module provided by an embodiment of the present disclosure, each light emitting unit includes: a light source configured to emit monochromatic light; and a wavelength conversion layer formed on a light emitting surface of the light source.

According to another aspect of the present disclosure, a display device is also provided. Specifically, the display device includes the backlight module according to any of the preceding embodiments.

According to yet another aspect of the present disclosure, a fabricating method for a backlight module is also provided. Specifically, the fabricating method includes: providing a plurality of light emitting units in an array on a first surface of a first substrate; providing a metal wire grid polarizer on a second surface of the first substrate opposite to the first surface; and providing a driving circuit. Further, the driving circuit is electrically connected to the plurality of light emitting units to drive the plurality of light emitting units to emit light toward the first substrate.

According to a specific implementation, in the fabricating method for a backlight module provided by an embodiment of the present disclosure, the step of providing the driving circuit includes: providing the driving circuit on the first surface of the first substrate, the driving circuit including transparent regions and non-transparent regions arranged in an array. Furthermore, the step of providing the plurality of light emitting units in an array on the first surface of the first substrate includes: providing the plurality of light emitting units in the transparent regions of the driving circuit.

According to a specific implementation, the fabricating method for a backlight module provided by an embodiment of the present disclosure further includes the step of providing a second substrate on a side of the plurality of light emitting units away from the first substrate. Further, the step of providing the driving circuit includes: providing the driving circuit on a side of the second substrate facing the plurality of light emitting units.

According to a specific implementation, in the fabricating method for a backlight module provided by an embodiment of the present disclosure, the driving circuit includes a plurality of sub-driving circuits, wherein each of the sub-driving circuits is opposite to and integrated with a corresponding one of the light emitting units.

According to a specific implementation, in the fabricating method for a backlight module provided by an embodiment of the present disclosure, each light emitting unit includes a first sub-light emitting unit configured to emit red light, a second sub-light emitting unit configured to emit green light, and a third sub-light emitting unit configured to emit blue light.

According to a specific implementation, in the fabricating method for a backlight module provided by an embodiment of the present disclosure, each light emitting unit includes: a light source configured to emit monochromatic light; and a wavelength conversion layer formed on a light emitting surface of the light source.

DETAILED DESCRIPTION OF THE EMBODIMENTS

Figure 1:
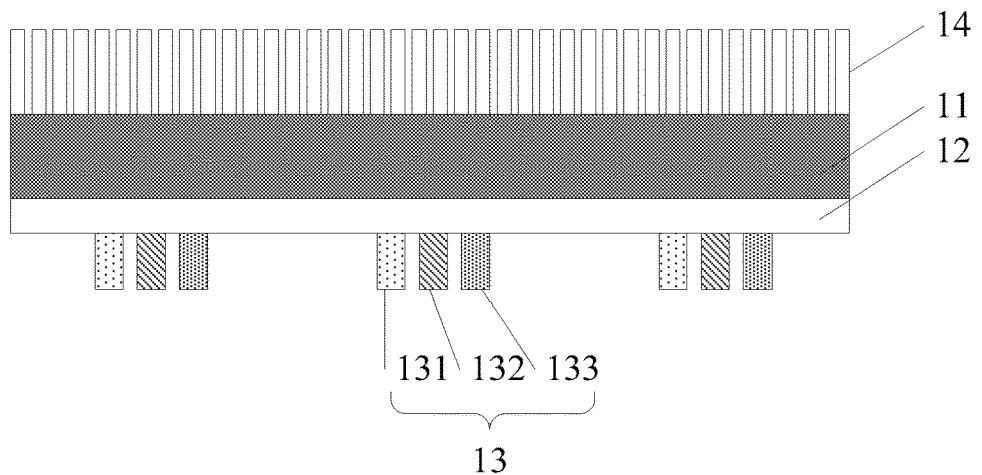
FIG. 1 schematically illustrates a cross-sectional view of a backlight module according to an embodiment of the present disclosure.

Exemplary embodiments of the present disclosure will be described in more detail below with reference to the accompanying drawings. While the exemplary embodiments of the present disclosure are shown in the drawings, it should be understood that the present disclosure may be implemented in various ways and should not be limited by the embodiments set forth herein. Rather, these embodiments are provided so that the present disclosure will be understood more clearly, and the scope of the present disclosure can be fully conveyed to those skilled in the art.

Referring to FIG. 1, a cross-sectional view of a backlight module according to an embodiment of the present disclosure is schematically illustrated.

According to an embodiment of the present disclosure, a backlight module is provided. Specifically, the backlight module includes a first substrate 11, light emitting units 13 and a driving circuit 12 formed on a lower surface of the first substrate 11, and a metal wire grid polarizer 14 formed on an upper surface of the first substrate 11. In the backlight module, the light emitting units 13 are arranged in an array on the first substrate 11. Further, the driving circuit 12 is electrically connected to the light emitting units 13 to drive the light emitting units 13 to emit light. In the backlight module shown in FIG. 1, light emitting surfaces of the light emitting units 13 face the first substrate 11, and the light emitting units 13 emit light toward the first substrate 11.

Specifically, the driving circuit 12 is formed on the first substrate 11, in particular, on a lower surface of the first substrate, and includes transparent regions and non-transparent regions. The light emitting units 13 are formed in the transparent regions on the driving circuit 12. Those skilled in the art will readily appreciate that the non-transparent regions of the driving circuit 12 are primarily used for circuit components required to drive the light emitting units to emit light. Therefore, by disposing the light emitting units in the transparent regions of the driving circuit, the driving circuit will not block the light emitted from the light emitting units.

As an example, each light emitting unit 13 may include three LEDs for emitting red, green, and blue light, respectively. As shown in FIG. 1, each light emitting unit 13 includes a LED 131, a LED 132, and a LED 133. Typically, each LED is small in size and indistinguishable by human eyes. As an example, each LED typically has a size on the order of microns. In view of above, a light mixing distance of the LEDs is relatively small, which can reduce the thickness of the backlight module to some extent. Specifically, light emitted from LEDs at different positions may overlap after traveling a certain distance, resulting in color mixing. It will be readily understood by those skilled in the art that a distance between the position where the LED is located and the position at which the color mixture occurs is the light mixing distance. The light emitted from each of the light emitting units 13 appears as white light after mixing. Therefore, by arranging the light emitting units in an array, uniform white light can be obtained. As an example, the arrangement order of the three LEDs in each light emitting unit 13 may be in the order of a red LED, a green LED and a blue LED. Of course, alternatively, it may be arranged in the order of a red LED, a blue LED and a green LED. Further optionally, it may also be arranged in the order of a green LED, a red LED and a blue LED. This means that in each of the light emitting units 13, the arrangement order of the three LEDs may be the same or different, as long as it can be ensured that the light emitted from the three LEDs in the respective light emitting unit appears as white light after mixing.

As an alternative example, each light emitting unit 13 may further include a monochrome LED (i.e., an LED configured to emit monochromatic light) and a wavelength conversion layer formed on a light emitting surface of the monochrome LED. Specifically, a wavelength conversion material may be coated on the light emitting surface of the monochromatic LED to form a wavelength conversion layer. In more detail, the light emitted by the monochromatic LED excites the wavelength conversion material in the wavelength conversion layer, for example, to obtain light of a different color, thereby forming white light after mixing. Illustratively, the wavelength conversion layer can include a quantum dot wavelength conversion layer. Generally, a quantum dot wavelength conversion layer can be formed on the light emitting surface of the blue LED. In an alternative example, the quantum dot wavelength conversion layer can include green light quantum dots and red light quantum dots. In such a case, part of the blue light emitted by the blue LED will be converted into green and red light after being absorbed by the respective quantum dots. After that, the remaining blue light is mixed with the resulting green light and red light after conversion, so as to form white light. Alternatively, a layer of luminescent quantum dots can also be coated on a light emitting surface of an ultraviolet LED. Thus, ultraviolet light emitted from the ultraviolet LED will excite the luminescent quantum dots, thereby emitting more than one color of light. After that, the light of these colors can be mixed directly to produce white light. Typically, the quantum dot particles are small in size and the size of the monochromatic LED is also small. Therefore, the light mixing distance of the LED is made small, so that the thickness of the backlight module can be reduced to some extent.

In detail, based on the driving voltage of the driving circuit and the array arrangement of the light emitting units, the white balance and brightness of the light provided by the backlight module can be controlled.

In an embodiment, the metal wire grid polarizer 14 may be configured to convert un-polarized light emitted from the light emitting surface of the light emitting unit into polarized light. Advantageously, the metal wire grid polarizer has a higher light transmission than a conventional polarizer. Typically, the metal wire grid polarizer can have a light transmission greater than 60%, thereby greatly increasing the utilization of light emitted from the light emitting units. Further, a thickness of the metal wire grid polarizer is generally in the range of 100 to 200 nm. In comparison, a thickness of a conventional polarizer is generally several tens of micrometers. Therefore, by using a metal wire grid polarizer instead of a conventional lower polarizer, the thickness of the backlight module can be reduced to some extent.

In an embodiment of the present disclosure, the backlight module includes only the first substrate, the driving circuit, the light emitting units and the metal wire grid polarizer. Therefore, the entire backlight module is relatively simple in structure. In addition, in the backlight module, only one substrate is required. Meanwhile, the thicknesses of the driving circuit, the light emitting unit and the metal wire grid polarizer are relatively small, which makes the overall thickness of the backlight module to be small.

In an embodiment of the present disclosure, a driving circuit is formed on one surface of the first substrate, and light emitting units are formed in transparent regions of the driving circuit, while a metal wire grid polarizer is formed on the other opposite surface of the first substrate. Further, the driving circuit is electrically connected to the light emitting units to drive the light emitting units to emit light, and light emitting surfaces of the light emitting units face the first substrate. Furthermore, the light emitting units are arranged in an array on the first substrate. Thus, the backlight module includes only the substrate, the driving circuit, the light emitting units, and the metal wire grid polarizer. In this way, the structure of the entire backlight module is relatively simple. Moreover, the thickness of each component in the backlight module is relatively small, which makes the overall thickness of the backlight module to be small. Further, since the metal wire grid polarizer has a high light transmittance, the utilization of light emitted from the light emitting units can be improved.

Figure 2:
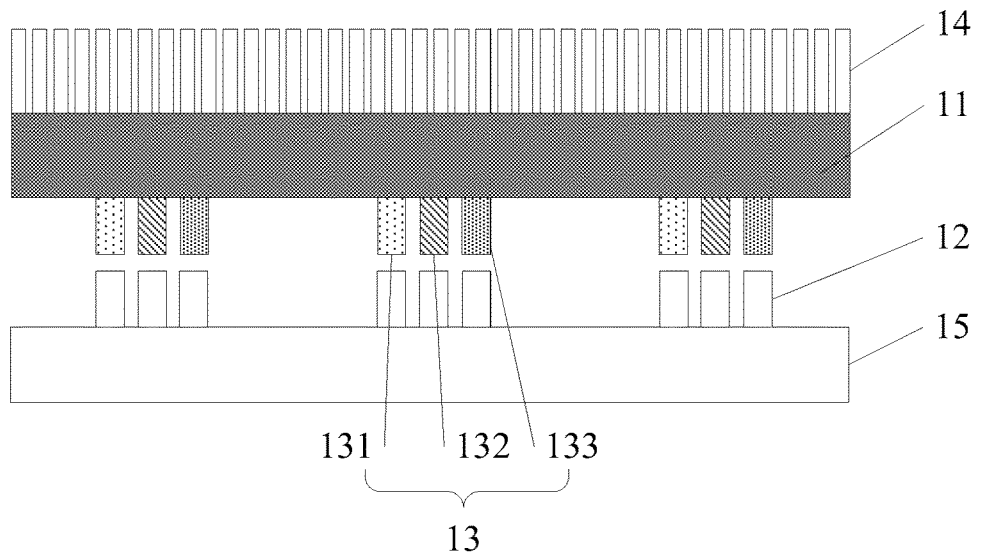
FIG. 2 schematically illustrates a cross-sectional view of a backlight module according to another embodiment of the present disclosure.

Referring to FIG. 2, a cross-sectional view of a backlight module according to another embodiment of the present disclosure is schematically illustrated.

In another embodiment of the present disclosure, a backlight module is also provided. As can be seen from FIG. 2, the backlight module has a substantially similar structure to the backlight module shown in FIG. 1. The difference between the two is that, in the backlight module shown in FIG. 2, the light emitting units 13 are formed on the first substrate 11, and the driving circuit 12 is formed on the second substrate 15. In addition, referring to FIG. 2, the driving circuit 12 may further include a plurality of sub-driving circuits, wherein each of the sub-driving circuits is disposed opposite to and integrated with a corresponding one of the light emitting units 13.

Specifically, each light emitting unit 13 may include a LED 131, a LED 132, and a LED 133 that are configured to emit red, green, and blue light respectively. In each of the light emitting units 13, the arrangement order of the three LEDs may be the same or different. Alternatively, each light emitting unit 13 may further include a monochrome LED and a wavelength conversion layer formed on a light emitting surface of the monochrome LED.

In order to obtain uniform white light, the distance between two adjacent light emitting units and the light mixing distance can be determined by simulation and design, thereby determining the array arrangement of the light emitting units according to the distance between two adjacent light emitting units and the light mixing distance. Thus, it is not necessary to arrange the light emitting units in the entire regions of the first substrate, so that the number of light emitting units can be reduced, and the production cost can be reduced. Meanwhile, uniform white light can be obtained by arranging the light emitting units in an array.

In an embodiment of the present disclosure, light emitting units are formed on one surface of the first substrate, and a driving circuit is formed on the second substrate, wherein each of the light emitting units is disposed opposite to and integrated with one of sub-driving circuits in the driving circuit. Meanwhile, a metal wire grid polarizer is further formed on the other surface of the first substrate. Specifically, the driving circuit is electrically connected to the light emitting units to drive the light emitting unit to emit light, and light emitting surfaces of the light emitting units face the first substrate, wherein the light emitting units are arranged in an array on the first substrate. In such a case, the backlight module includes only the substrate, the driving circuit, the light emitting units, and the metal wire grid polarizer. Therefore, the structure of the backlight module is relatively simple, and the thickness of each component in the backlight module is small, so that the overall thickness of the backlight module is small. Further, since the metal wire grid polarizer has a high light transmittance, the utilization of light emitted from the light emitting units can also be improved.

Embodiments of the present disclosure also provide a display device. Specifically, the display device includes the backlight module as described in any of the above embodiments. In detail, the backlight module includes a first substrate, light emitting units and a driving circuit on one surface of the first substrate, and a metal wire grid polarizer formed on the other surface of the first substrate. Further, the driving circuit is electrically connected to the light emitting units to drive the light emitting units to emit light, and light emitting surfaces of the light emitting units face the first substrate, wherein the light emitting units are arranged in an array on the first substrate.

As an example, the light emitting units are formed on the first substrate, and the driving circuit is formed on the second substrate, wherein each of the light emitting units is disposed opposite to and integrated with one of the sub-driving circuits in the driving circuit.

Alternatively, the driving circuit is formed on the first substrate and includes transparent regions and non-transparent regions arranged in an array, wherein the light emitting units are formed in the transparent regions of the driving circuit.

The light emitting unit includes three LEDs that are configured to emit red, green and blue light respectively, and in each of the light emitting units, the arrangement order of the three LEDs may be the same or different. Alternatively, each light emitting unit may further include a monochrome LED and a wavelength conversion layer formed on a light emitting surface of the monochrome LED.

In an embodiment of the present disclosure, since the backlight module includes the metal wire grid polarizer, it is not necessary to provide a lower polarizer in the display device. The display device includes a liquid crystal display (LCD). However, the present disclosure is by no means limited to a LCD. For a detailed description of the backlight module, reference may be made to the embodiments as described above in connection with FIG. 1 and FIG. 2, which will not be described again herein.

In an embodiment of the present disclosure, the display device includes a backlight module. Specifically, light emitting units and a driving circuit are formed on one surface of the first substrate, and a metal wire grid polarizer is formed on the other opposite surface of the first substrate, wherein the driving circuit is electrically connected to the light emitting units to drive the light emitting units to emit light. In addition, light emitting surfaces of the light emitting units face the first substrate, and the light emitting units are arranged in an array on the first substrate. In this way, the backlight module includes only the substrate, the driving circuit, the light emitting units, and the metal wire grid polarizer. Thus, the structure of the backlight module is relatively simple, and the thickness of each component in the backlight module is small, so that the overall thickness of the backlight module is small. Further, since the metal wire grid polarizer has a high light transmittance, the utilization of light emitted from the light emitting units can be improved.

Figure 3:
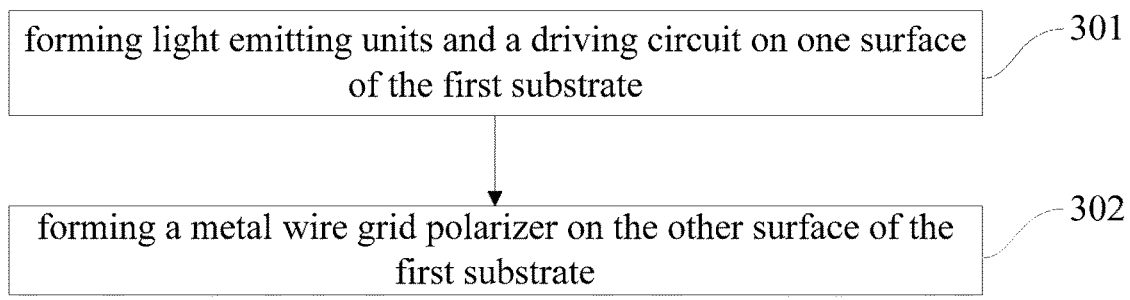
FIG. 3 schematically illustrates a flow chart of a fabricating method for a backlight module according to an embodiment of the present disclosure.

Referring to FIG. 3, a flow chart of a fabricating method for a backlight module according to an embodiment of the present disclosure is schematically illustrated. Specifically, the fabricating method may include the following steps.

Step 301: forming light emitting units and a driving circuit on one surface of a first substrate.

In an embodiment of the present disclosure, light emitting units and a driving circuit are first fabricated on one surface of a first substrate. Specifically, the driving circuit is electrically connected to the light emitting units to drive the light emitting units to emit light. Further, light emitting surfaces of the light emitting units face the first substrate, and the light emitting units are arranged in an array on the first substrate.

Figure 4:
FIG. 4 schematically illustrates a cross-sectional view of a backlight module, after the fabrication of driving circuit is completed, during the process of fabricating the backlight module as shown in FIG. 1.

Referring to FIG. 4, a cross-sectional view of a backlight module, after the fabrication of driving circuit is completed, during the process of fabricating the backlight module as shown in FIG. 1 is schematically illustrated.

Firstly, the driving circuit 12 is formed on the first substrate 11. Specifically, the driving circuit is fabricated on one surface of the first substrate, wherein the driving circuit includes transparent regions and non-transparent regions, and circuits required to drive the light emitting units to emit light are arranged in the non-transparent regions. In an embodiment of the present disclosure, any suitable fabrication method for the driving circuit can be selected according to actual needs.

Figure 5:
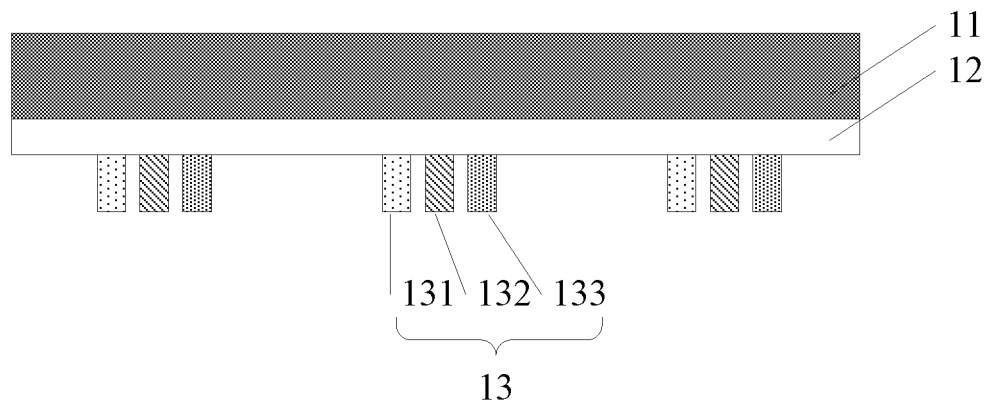
FIG. 5 schematically illustrates a cross-sectional view of a backlight module, after the fabrication of light emitting units is completed, during the process of fabricating the backlight module as shown in FIG. 1.

Referring to FIG. 5, a cross-sectional view of a backlight module, after the fabrication of light emitting units is completed, during the process of fabricating the backlight module as shown in FIG. 1 is schematically illustrated.

Next, the light emitting units 13 are formed in transparent regions on the driving circuit 12. As an example, each lighting unit includes a LED 131, a LED 132, and a LED 133 that are configured to emit red, green, and blue light respectively. Alternatively, each light emitting unit includes a monochrome LED and a wavelength conversion layer formed on a light emitting surface of the monochrome LED. When the light emitting unit includes the above three LEDs, the three LEDs are attached directly on the transparent regions of the driving circuit. When the light emitting unit includes the monochrome LED and the wavelength conversion layer formed on the light emitting surface of the monochrome LED, a wavelength conversion material is coated on the light emitting surface of the monochrome LED, and then they are attached together in the transparent regions of the driving circuit.

Figure 6:
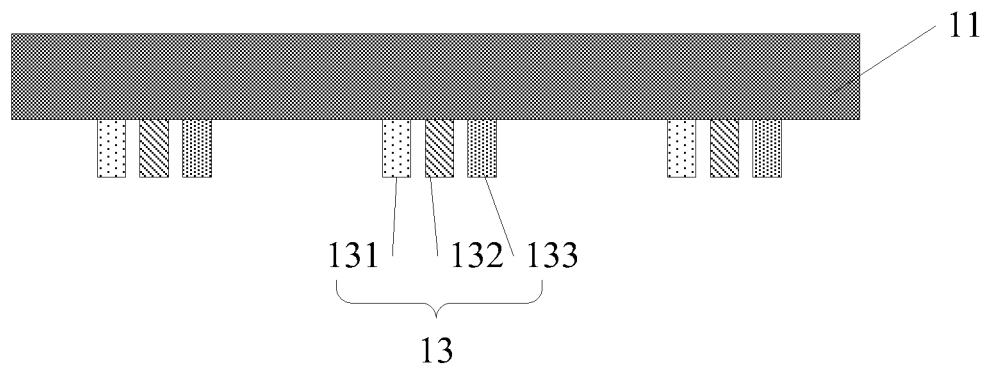
FIG. 6 schematically illustrates a cross-sectional view of a backlight module, after the fabrication of light emitting units is completed, during the process of fabricating the backlight module as shown in FIG. 2.

Referring to FIG. 6, a cross-sectional view of a backlight module, after the fabrication of light emitting units is completed, during the process of fabricating the backlight module as shown in FIG. 2 is schematically illustrated.

Firstly, the light emitting units 13 are formed on the first substrate 11. Specifically, each lighting unit includes a LED 131, a LED 132, and a LED 133 that are configured to emit red, green, and blue light respectively. Alternatively, each light emitting unit includes a monochrome LED and a wavelength conversion layer formed on a light emitting surface of the monochrome LED.

Figure 7:
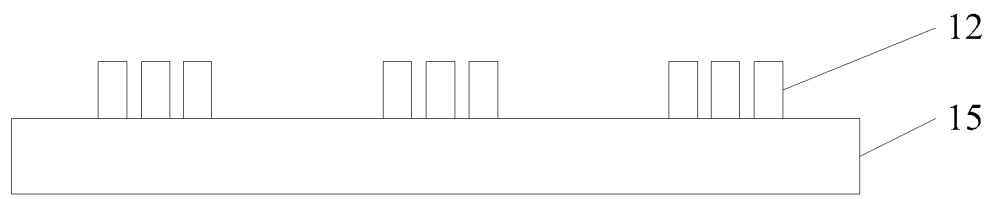
FIG. 7 schematically illustrates a cross-sectional view of a backlight module, after the fabrication of driving circuit is completed, during the process of fabricating the backlight module as shown in FIG. 2.

Referring to FIG. 7, a cross-sectional view of a backlight module, after the fabrication of driving circuit is completed, during the process of fabricating the backlight module as shown in FIG. 2 is schematically illustrated.

Next, the driving circuit 12 is formed on the second substrate 15.

Figure 8:
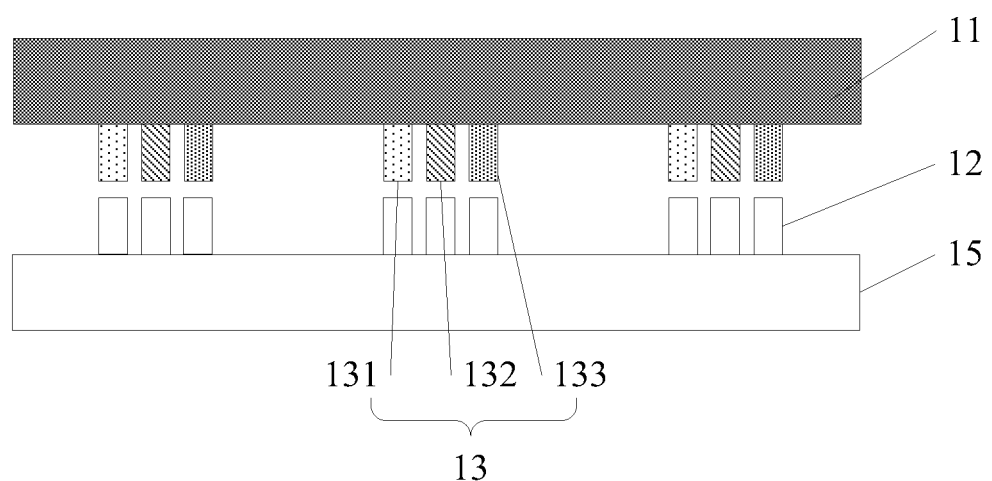
FIG. 8 schematically illustrates a cross-sectional view of a backlight module, after integration of a driving circuit and light emitting units, during the process of fabricating the backlight module as shown in FIG. 2.

Referring to FIG. 8, a cross-sectional structural view of a backlight module, after integration of a driving circuit and light emitting units, during the process of fabricating the backlight module as shown in FIG. 2 is schematically illustrated.

Then, the driving circuit 12 is integrated with the light emitting units 13. Specifically, each of the light emitting units is disposed opposite to and integrated with a corresponding sub-driving circuit, wherein each of the sub-driving circuits is configured to drive the corresponding light emitting unit to emit light.

Step 302, forming a metal wire grid polarizer on the other surface of the first substrate.

In an embodiment of the present disclosure, the metal wire grid polarizer may be formed on the other surface of the first substrate by a method of nanoimprinting. Specifically, a metal film layer is fabricated on one surface of the first substrate, and then a photoresist is coated on the metal film layer. Thereafter, the photoresist is imprinted using an imprint template of a metal wire grid polarizer (WGP), to form a photoresist pattern for the grating structure. Finally, the metal film layer that is not covered by the photoresist is etched by an etching technique, so as to form a plurality of grating regions.

On the basis of FIG. 5, the backlight module as shown in FIG. 1 can be obtained by forming the metal wire grid polarizer on the other surface of the first substrate.

On the basis of FIG. 8, the backlight module as shown in FIG. 2 can be obtained by forming the metal wire grid polarizer on the other surface of the first substrate.

In an embodiment of the present disclosure, light emitting units and a driving circuit are formed on one surface of a first substrate, and a metal wire grid polarizer is formed on the other surface of the first substrate. Specifically, the driving circuit is electrically connected to the light emitting units to drive the light emitting units to emit light, and light emitting surfaces of the light emitting units face the first substrate, wherein the light emitting units are arranged in an array on the first substrate. In such a case, the backlight module includes only the substrate, the driving circuit, the light emitting units, and the metal wire grid polarizer. Thus, the structure of the backlight module is relatively simple, and the thickness of each component in the backlight module is small, so that the overall thickness of the backlight module is small. Further, since the metal wire grid polarizer has a high light transmittance, the utilization of light emitted from the light emitting units can be improved.

In the foregoing method embodiments, for the sake of simple description, the methods are all expressed as a combination of actions. However, those skilled in the art should understand that the present disclosure is not limited by the order of actions as described. The reason is that certain steps may be performed in other orders or concurrently according to teachings of the present disclosure. In addition, those skilled in the art should also understand that the embodiments described in the specification are all optional embodiments, and the actions and modules involved are not necessarily required by the present disclosure.

In the present specification, various embodiments are described in a progressive manner. Therefore, it is to be noted that, in the description of each embodiment, emphasis is put on the part which is different from the other embodiments, and the same or similar parts between the respective embodiments can be referred to each other.

Finally, it should also be noted that in the present context, relational terms such as first and second are used merely to distinguish one entity or operation from another entity or operation, and do not necessarily require or imply any such actual relationship or order between these entities or operations. Furthermore, the terms of "include", "comprise," or any other variant thereof are intended to cover non-exclusive inclusions, such that processes, methods, items, or devices that comprise a series of elements include not only those elements but also other elements not explicitly listed, or, elements inherent in such processes, methods, items, or devices. An element that is defined by the phrase of "comprising a" does not exclude the presence of other identical elements in the process, method, item, or device that comprises the element.

The backlight module, the display device and the fabricating method for the backlight module provided by the present disclosure are described in detail above. The principles and embodiments of the present disclosure have been described in detail herein with specific examples. The above description of the embodiments is merely to assist in understanding the method of the present disclosure and its core idea. Meanwhile, based on the idea of the present disclosure, various modifications in the implementation and the application scope can be easily conceived by those of ordinary skill in the art. In conclusion, the content of the specification should not be construed as limiting the present disclosure.

The invention claimed is:

1. A backlight module, comprising:
   a first substrate having a first surface and a second surface opposite to each other;
   a plurality of light emitting units arranged in an array on the first surface of the first substrate;
   a metal wire grid polarizer on the second surface of the first substrate; and
   a driving circuit,
   wherein the driving circuit is electrically connected to the plurality of light emitting units and is configured to drive the plurality of light emitting units to emit light toward the first substrate,
   wherein the driving circuit is between the first substrate and the plurality of light emitting units,
   wherein the driving circuit comprises transparent regions and non-transparent regions arranged in an array, and
   wherein the plurality of light emitting units are in the transparent regions of the driving circuit.

2. The backlight module according to claim 1, further comprising:
   a second substrate on a side of the plurality of light emitting units away from the first substrate,
   wherein the driving circuit is on a side of the second substrate facing the plurality of light emitting units.

3. The backlight module according to claim 2,
   wherein the driving circuit comprises a plurality of sub-driving circuits, and
   wherein ones of the sub-driving circuits are opposite to and integrated with corresponding ones of the light emitting units.

4. The backlight module according to claim 1,
   wherein ones of the light emitting units comprise corresponding first sub-light emitting units configured to emit red light, corresponding second sub-light emitting units configured to emit green light, and corresponding third sub-light emitting units configured to emit blue light.

5. The backlight module according to claim 1,
   wherein ones of the light emitting units comprise corresponding light sources configured to emit monochromatic light, and corresponding wavelength conversion layers formed on a light emitting surface of the corresponding light sources.

6. A display device, comprising:
   the backlight module according to claim 1.

7. The display device according to claim 6, wherein the backlight module further comprises:
   a second substrate on a side of the plurality of light emitting units away from the first substrate,
   wherein the driving circuit is on a side of the second substrate facing the plurality of light emitting units.

8. The display device according to claim 7,
   wherein the driving circuit comprises a plurality of sub-driving circuits,
   wherein ones of the sub-driving circuits are opposite to and integrated with corresponding ones of the light emitting units.

9. The display device according to claim 6,
   wherein ones of the light emitting units comprise corresponding first sub-light emitting units configured to emit red light, corresponding second sub-light emitting units configured to emit green light, and corresponding third sub-light emitting units configured to emit blue light.

10. The display device according to claim 6,
wherein each ones of the light emitting unit units comprise comprises corresponding light source sources configured to emit monochromatic light, and corresponding wavelength conversion layer layers formed on a light emitting surface of the corresponding light source sources.

11. A fabricating method for a backlight module, comprising:
providing a driving circuit on a first surface of a first substrate, wherein the driving circuit comprises transparent regions and non-transparent regions arranged in a second array,
providing a plurality of light emitting units in a first array on the first surface of the first substrate in the transparent regions of the driving circuit; and
providing a metal wire grid polarizer on a second surface of the first substrate opposite to the first surface,
wherein the driving circuit is electrically connected to the plurality of light emitting units and configured to drive the plurality of light emitting units to emit light toward the first substrate.

12. The fabricating method according to claim 11, further comprising:
providing a second substrate on a side of the plurality of light emitting units away from the first substrate,
wherein the providing the driving circuit comprises providing the driving circuit on a side of the second substrate facing the plurality of light emitting units.

13. The fabricating method according to claim 12,
wherein the driving circuit comprises a plurality of sub-driving circuits, and
wherein ones of the sub-driving circuits are opposite to and integrated with corresponding ones of the light emitting units.

14. The fabricating method according to claim 11,
wherein ones of the light emitting units comprise corresponding first sub-light emitting units configured to emit red light, corresponding second sub-light emitting units configured to emit green light, and corresponding third sub-light emitting units configured to emit blue light.

15. The fabricating method according to claim 11,
wherein ones of the light emitting units comprise corresponding light sources configured to emit monochromatic light, and corresponding wavelength conversion layers formed on a light emitting surface of the corresponding light sources.

* * * * *